United States Patent [19]

Winter

[11] 3,861,936

[45] Jan. 21, 1975

[54] EXTRUDABLE PLASTE TOOLING METHOD

[75] Inventor: Lloyd E. Winter, Los Angeles, Calif.

[73] Assignee: Ciba-Geigy Corporation, Ardsley, N.Y.

[22] Filed: July 28, 1971

[21] Appl. No.: 166,825

[52] U.S. Cl................ 117/8, 117/161 ZB, 222/176
[51] Int. Cl................................................ B44c 1/20
[58] Field of Search............ 117/8, 161 ZB, 132 BE, 117/121; 264/171, 162, 216; 156/244; 118/DIG. 4, 324; 222/176

[56] References Cited
UNITED STATES PATENTS

| | | | |
|---|---|---|---|
| 2,159,704 | 5/1939 | Levey | 117/44 |
| 2,587,930 | 3/1952 | Uschmann | 264/171 X |
| 2,901,770 | 9/1959 | Beck | 264/171 X |
| 2,989,352 | 6/1961 | Schmidt | 117/161 ZB |
| 3,207,831 | 9/1965 | Geller | 264/117 X |
| 3,242,244 | 3/1966 | Maly | 117/161 ZB |
| 3,652,486 | 3/1972 | Young | 260/32.6 R |
| R10,462 | 4/1884 | Buchanan | 117/44 |

Primary Examiner—William D. Martin
Assistant Examiner—Theodore G. Davis
Attorney, Agent, or Firm—Miller, Morriss, Pappas & McLeod

[57] ABSTRACT

A plastic tooling method and apparatus are provided for producing a master tooling model by extruding a layer of carvable epoxy resin at a uniform thickness upon a preconstructed base for the master tooling model being constructed. The tooling method consists of the following steps:

1. constructing the master model base and subsurface so that the subsurface, or reference points are below the true net loft line, 2. extruding a layer of carvable epoxy resin at a controlled uniform thickness onto the surface of the preconstructed base to a point above the true net loft line, and 3. machining, after cure, the surface of the oversized master tool to the true net loft line.

The apparatus consists of a resin metering, mixing and dispensing applicator assembly provided with an applicator nozzle capable of applying a layer of viscous carvable epoxy resin of uniform thickness upon a preconstructed base so as to produce a master tooling model.

2 Claims, 6 Drawing Figures

INVENTOR
LLOYD E. WINTER

EXTRUDABLE PLASTE TOOLING METHOD

SUMMARY OF THE INVENTION

The invention relates to a unique plastic tooling method and apparatus whereby a master tooling model surface can be developed by extruding a uniformly thick viscous layer of carvable epoxy resin upon the subsurface of the master tooling model being constructed. A resin dispensing apparatus having an applicator hose and nozzle is utilized to apply the layer of carvable epoxy resin. The method consists of (1) constructing a rough, undersized master tooling model substructure base in a standard manner with the surface below the true net loft line of the master tooling model being constructed, (2) applying a uniformly thick layer of viscous carvable epoxy resin to the surface of the preconstructed base whereby the thickness of the layer being applied is sufficient to raise the surface of the tool to a uniform level above the true net loft line of the master tooling model giving a minimum of wasted or excess material, and (3) after cure, the oversize master tool is placed on a N/C (numerically-controlled) or other conventional machine tool and its surface is machined to the true net loft line. The surface can also be hand carved or worked to the true net loft line.

PRIOR ART

The prior methods for fabricating plastic master tooling models for use in industry have included the use of hand troweling or spraying techniques to apply a layer of carvable epoxy resin material upon the subsurface of the master tool being constructed. The spray technique was more economical as compared to the cost for the original splined or hand application technique. However, the spray method resulted in a carvable surface layer having a variable porosity and air bubble voids. The air bubble voids were generally trapped between the multiple sprayed layers inherent in the use of the spray technique. These air bubble voids were subsequently exposed upon machining and required considerable hand patching. This increased the cost of constructing the master tool model and minimized the savings brought about originally by use of the spray technique.

Further, in the spray technique method of applying the carvable resin, the material could only be built up to a limited thickness of one-eighth inch to one-half inch at one time. It then had to be allowed to exotherm before the next layer was applied. This procedure was both time consuming and expensive. It also was limited in the thickness that the materials could be applied to a vertical surface without run-off.

Another disadvantage to the use of the spray technique was that expensive spray booth equipment and other safety devices and procedures be utilized for health and safety reasons which also added to the costs involved.

The spray technique also involved up to 20 percent material waste due to overspray inherent in the use of spray apparatus. This increased the costs involved.

Another prior method of fabrication involved bonding together preformed blocks (of wood, impregnated materials or cast syntactic foam) to obtain a machinable or carvable rough model. These presented problems with grain orientation, extensive labor for bonding, material waste in developing a surface, and heterogeneous bond lines which gave trouble in carving and/or machining.

The plastic tooling method of this invention permits the application by extrusion of a single, thick viscous layer of carvable resin upon the subsurface of the master tool being fabricated. The use of the extrusion technique permits the application of the entire layer of carvable epoxy resin at a uniform thickness in a single application step. Upon curing, the resultant surface layer is ready for final machining to the true net loft line of the master tool model being constructed. Nowhere in the prior art methods is there shown a plastic tooling method, such as that of this invention, which eliminates the need for hand mixing, spray booth equipment, labor involved in hand mixing, bonding, application by hand troweling, wasted materials due to overspray, and the need for application of multiple layers of resin in order to achieve a carvable resin layer upon the master tool being fabricated.

In general, the method embodied in this invention greatly reduces labor and lead time commonly associated with master model construction. The extrudable paste tooling method of the present invention permits the continuous application of a single, uniformly thick layer of carvable epoxy resin upon the master tool which is void free and of a constant pre-determined thickness.

OBJECTS

It is therefore an object of this invention to provide a method and apparatus for producing a master tooling model by extruding a single homogeneous layer of carvable epoxy resin at a uniform thickness upon a preconstructed model base.

Another object of this invention is to provide a dimensionally stable, very lightweight layer of carvable epoxy resin upon a master tooling model base.

A still further object of this invention is to provide an extrudable paste tooling method and apparatus whereby lightweight, low density, epoxy resin paste materials can be utilized.

Yet another object of this invention is to provide a method and apparatus for producing a master tooling model whereby a carvable epoxy resin surface layer is provided which is of a uniform density and is free from air bubble voids.

A still further object of this invention is to provide a method and apparatus for producing a master tooling model whereby an extruded carvable epoxy resin layer can be applied to the vertical surfaces of a preconstructed base substantially without limitations due to the run-off or hang-up characteristics of the material being applied.

Another object of this invention is to provide a method and apparatus for extruding a uniform, thick, viscous layer of carvable epoxy resin upon a preconstructed base in a single application step rather than by use of the time-consuming multiple layer spray technique involving a plurality of intermediate spray application and curing steps.

Yet another object of this invention is to provide a method and apparatus for applying contiguous strips of carvable epoxy resin upon a preconstructed base so as to form a continuous, dimensionally stable, uniformly thick layer of carvable epoxy resin thereon.

Still another object of this invention is to provide a method and apparatus for forming a master tooling model whereby a layer of carvable epoxy resin is extruded at a uniform thickness onto the surface of preconstructed base to a point above the true net loft line and which, after curing, is machined down to the true net loft line to form the desired working surface of the master tooling model.

Another object of this invention is to permit the use of paste viscosity resins without fear of air entrapment which causes air bubble voids.

Yet another object of this invention is to eliminate waste material due to overspray inherent in the previously used spray techniques.

A still further object of this invention is to eliminate health hazards inherent in the previously used spray techniques.

Another object of this invention is to eliminate the need for expensive ancillary spray booths and spraying equipment required in the use of spray techniques.

Other objects and advantages found in the method and construction of the invention will be apparent from a consideration of the following specification in connection with the appended claims and the accompanying drawings.

IN THE DRAWINGS

GENERAL DESCRIPTION

In general, an extrudable paste tooling method and apparatus is provided for the rapid application of air-free low-density carvable epoxy resin pastes upon the surface of a preconstructed base in order to produce a master tooling model.

In this method, a layer of carvable epoxy resin is extruded at a controlled uniform thickness upon a preconstructed base to a point above the true net loft line of the master tooling model being constructed. After curing, the surface of the oversized master tool is machined down to the true net loft line. The machining operation is preferably accomplished by use of (N/C) numerically controlled machining techniques and equipment which are well known in the art and through the use of which contoured parts can be machined.

The use of the extrusion method of applying the carvable epoxy resin layer is faster than the previously used techniques of hand mixing and hand application by trowel. The extrusion method is also faster than the time consuming spray technique of depositing the epoxy resin upon the preconstructed base.

The preferred embodiment of the apparatus consists of a metering, mixing and dispensing assembly whereby the epoxy resin and hardener are pumped from separate drums into a metering device, through a static mixing tube or other mixing device and then extruded onto the desired surface through the use of an applicator nozzle. The applicator nozzle is mounted at the end of a pivotally mounted applicator boom which extends outwardly over the master tooling model which is being constructed.

The apparatus can selectively be mounted on a movable platform so as to permit controlled movement of the applicator nozzle over the surface of the preconstructed base while extruding a layer of carvable epoxy resin thereon.

SPECIFIC DESCRIPTION

Figure 1:
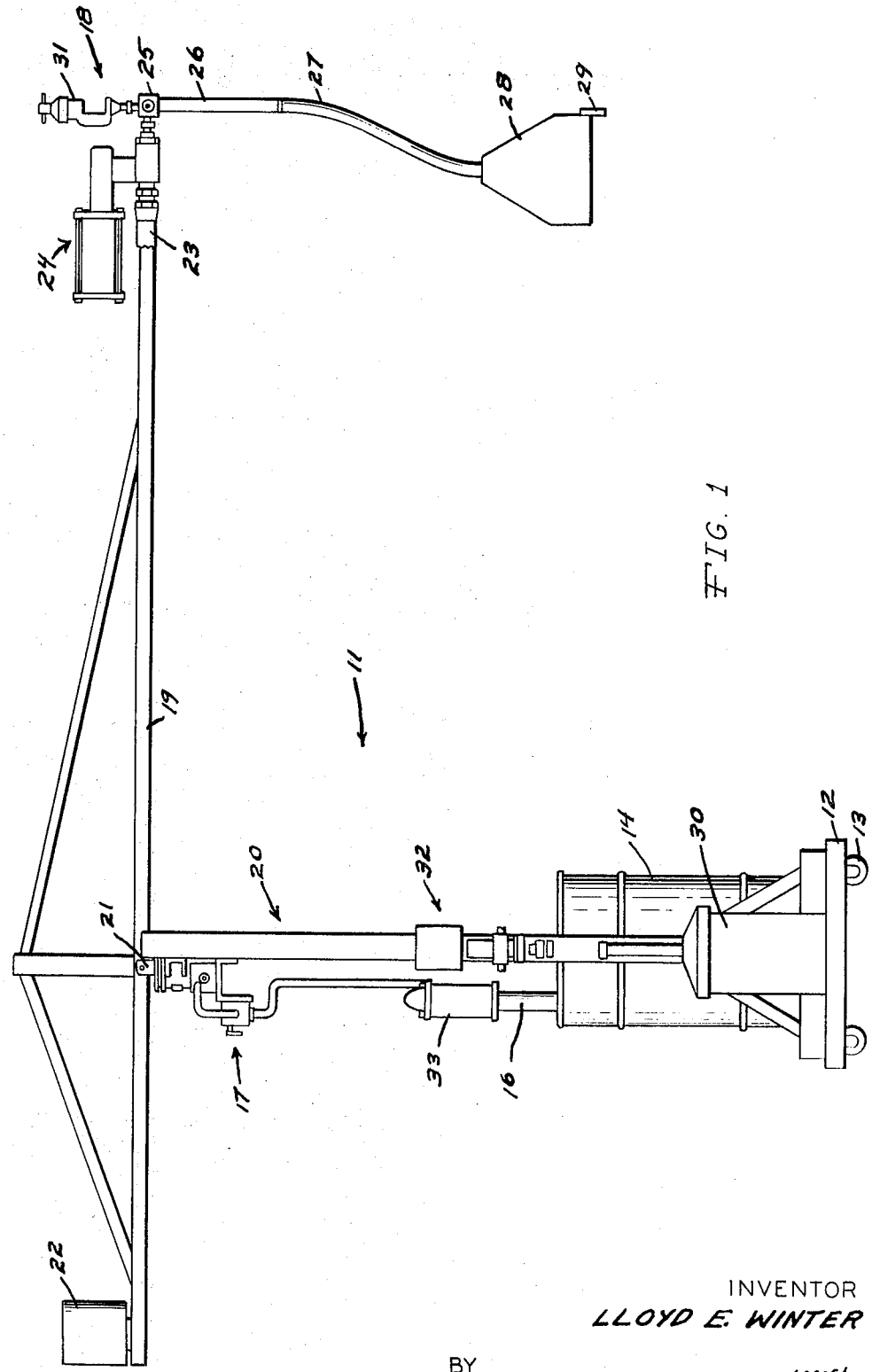
FIG. 1 is an elevation view of one embodiment of the application apparatus showing the pivotally mounted applicator boom and the applicator extruder nozzle affixed thereto.

An embodiment of the metering, mixing and dispensing apparatus 11 is shown in FIG. 1. The entire apparatus 11 is carried by a steel platform 12 which has four metal wheeled casters 13. The platform 12 is adapted to carry a pair of drums 14 and 15 (only one shown). One drum 14 contains the resin and the other drum 15 contains the hardener. Each of the drums is provided a pump assembly 16 which selectively pumps the contents of the drum (resin or hardener) to the metering assembly 17. In this embodiment of the invention, the metering of the resin/hardener system is accomplished by positive displacement metering cylinders which are linked together. Four-way material valves provide continuous flow of resin/hardener to the mixing head assembly 18 for dispensing. By use of such displacement metering, the ratio of resin/hardener is maintained within the recommended limits. It is also contemplated the other types of automatic metering and mixing assemblies be utilized to maintain the desired ratio of resin to hardener.

An applicator boom 19 is pivotally mounted at the top of the frames 20. The applicator boom 19 is mounted on a swivel plate 21 so as to pivot both vertically and horizontally as required. A counterweight 22 is mounted at one end of the boom 19 so as to reduce down loading at the dispensing point to a minimum. It is also considered to be within the scope of this invention to provide an applicator boom which is spring loaded so as to facilitate handling of the boom at the dispensing point. A hose assembly 23 (shown in part only) is provided which conveys the resin and hardener separately to the mixing head assembly 18 provided at the end of the applicator boom 19. The mixing head assembly 18 includes material shut-off valves 24 which selectively open and close as the unit is started and stopped so as to prevent the sag of mixed material from the dispensing nozzle 28 when not in use.

A material manifold 25 is provided which receives the separate metered resin and hardener materials and directs them into an elongate static mixing tube 26 which thoroughly blends the material into the viscous paste which is to be extruded. The mixing tube 26 is a labyrinth design and has no moving parts. This type of tube is well known in the art. It is also considered to be within the scope of the invention that other types of mixing devices can be used in place of the static mixing tube 26. The mixing tube 26 is provided with a flexible dispensing hose 27 which receives the mixed epoxy resin paste or foam material and delivers it to the application extruder nozzle 28 provided at the end thereof.

The applicator nozzle 28 has a generally flat configuration and is provided with a substantially rectangular opening. The size of the opening determines the thickness and width of the strip of carvable epoxy resin being extruded. Thus, the carvable epoxy resin can be extruded in a layer which can selectively be varied in thickness from a fraction of an inch to several inches. The width of the strip can also be varied from several inches to one or more feet. This is accomplished by using applicator nozzles having nozzle openings of the desired width and depth or thickness. Thus, the thickness and/or width of the strip being extruded can be selectively varied as desired by changing the size of the nozzle opening.

A spacer guide 29 is provided adjacent the nozzle opening which is adapted to engage the surface upon which the strip of epoxy resin paste is being extruded. By use of the guide 29 as a spacer device, the nozzle opening is maintained at a constant uniform distance from the surface. Thus, a layer of uniform thickness can be applied to the surface of the preconstructed base. A roller assembly (not shown) can be utilized on the nozzle 28 instead of spacer guide 29 so as to perform the same spacing function.

A solvent purge assembly 30 is provided on the platform 12 which contains a suitable solvent for cleaning the entire system so as to prevent the mixed resin from setting within the various portions of the apparatus. A solvent purge shut-off valve assembly 31 is provided in association with the material manifold 25. Suitable tubing (not shown) connects the purge assembly 30 to the solvent purge shut-off valve assembly 31 and is adapted to re-cycle the solvent as needed.

Each barrel 14 and 15 is positioned beneath an elevator assembly 32 provided on the apparatus frame. The elevator assembly is adapted to selectively raise and lower the material pump tube assembly 16 and drum follower plate (not shown) as the level of the contents of each drum changes. An air motor 33 is provided on each material pump 16 so as to actuate each pump as required.

Figure 2:
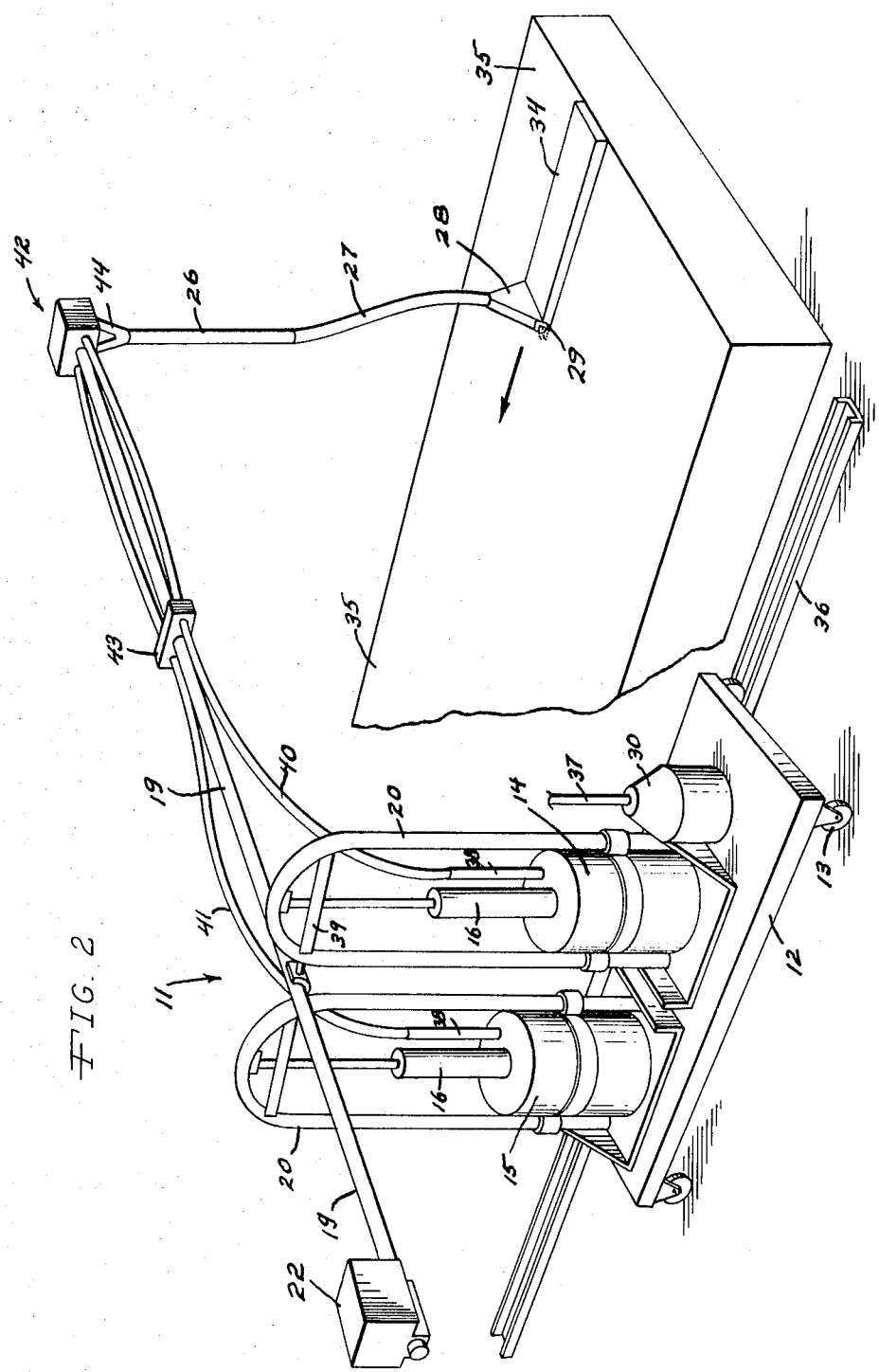
FIG. 2 is a schematic perspective view of another embodiment of the application apparatus in its operative use position extrudably applying a strip of carvable epoxy resin upon a preconstructed base in order to form a master tooling model.

A simplified embodiment of the apparatus 11 is schematically shown in FIG. 2. The apparatus 11 is shown in its operative use position applying a strip layer 34 of carvable epoxy resin to the surface of a preconstructed tooling model base 35.

The applicator apparatus 11 is positioned adjacent the preconstructed base 35 of a large master tooling model. Selected of the wheels or casters 13 of the platform 12 engage a floor-mounted track channel 36 which is positioned along the entire length of the master tool being produced. With the applicator apparatus 11 in its operative use position as shown in FIG. 2, the platform 12 can be moved parallel to the preconstructed base 35 so as to facilitate the orderly and controlled application of a plurality of contiguous strips 34 of carvable epoxy resin upon the surface of the preconstructed base 35 so as to form a continuous layer of carvable epoxy resin thereon. It should be noted that the use of the track channel 36 can be dispensed with when small master tooling models are being constructed.

As in the case of the embodiment of the applicator apparatus 11 shown in FIG. 1, the simplified embodiment of the applicator apparatus 11 of FIG. 2 is provided with resin drum container 14 and hardener drum container 15 positioned on the platform 12. The solvent purge container and assembly 30 is also positioned on the platform 12 along with associated pumps (not shown) and connecting tubing 37 (shown in part). The vertical support frames 20 are provided which also support for the material pump assemblies 16 and the outlet tube assemblies 38 which carry the resin and hardener material from their respective drum containers. A cross bar support member 39 is provided near the top portions of each of the vertical support frames so as to pivotally support the applicator boom 19 thereon.

The resin and hardener supply tubes 40 and 41, respectively, are supported by and extend to the end of applicator boom 19 to an automatic flow compensator metering unit 42 which measures and meters the resin and hardener materials into the proper ratio as desired while the materials are being pumped therethrough. A retainer member 43 is utilized to retain the tubes 40 and 41 adjacent the boom 19.

A Y-manifold 44 receives the metered materials from the metering unit 42 and directs them into the static mixing tube 26. A flexible applicator hose 27 is attached to end of the mixing tube 26 and receives the mixed carvable epoxy resin paste therefrom. The applicator hose 27 is provided with an applicator extruder nozzle 28 as previously discussed. The flexible applicator hose 27 can be varied in length so as to permit selective transverse shifting of the nozzle 28 across the surface of the base 35 to permit the extrusion of contiguous strips of carvable epoxy resin therealong.

OPERATION

In operation, a plastic tooling method and apparatus are provided for producing a master tooling model by extruding a layer of carvable epoxy resin at a uniform thickness upon a preconstructed base for the master tooling model being constructed. The tooling method consists of the following steps.

1. constructing the master tool base and subsurface so that the subsurface, or reference points are below the true net loft line, 2. extruding a layer of carvable epoxy resin at a controlled uniform thickness onto the subsurface of the master tool to a point above the true net loft line, and 3. machining, after cure, the surface of the oversized master tool to the true net loft line.

As previously discussed, the apparatus 11 consists of a resin metering, mixing and dispensing applicator assembly 11 provided with an applicator nozzle 28 capable of applying a layer of viscous carvable epoxy resin of uniform thickness upon a preconstructed base 35 so as to produce a master tooling model.

The preconstructed base 35 can be quickly and easily constructed in several ways. A plurality of blocks of pre-cast foams can be joined to form a base. A honeycomb panel can be positioned on a base in an egg-crate configuration, bonding all joints together with epoxy and glass. A polyurethane foam of suitable density or block of honeycomb material is then placed in the egg-crating. This may be done either by inserting and bonding blocks into place or by free foaming the polyurethane foam into place. The preconstructed base structure is then placed on a numerically controlled machine or is hand machined so that its surface is cut to a point one-half inch to three-quarter inch below the true net loft line. Other known methods of constructing the base include the use of tubing structures with tooling cloth and the use of formed wire mire mesh structures upon which the extruded epoxy can be applied.

Figure 3:
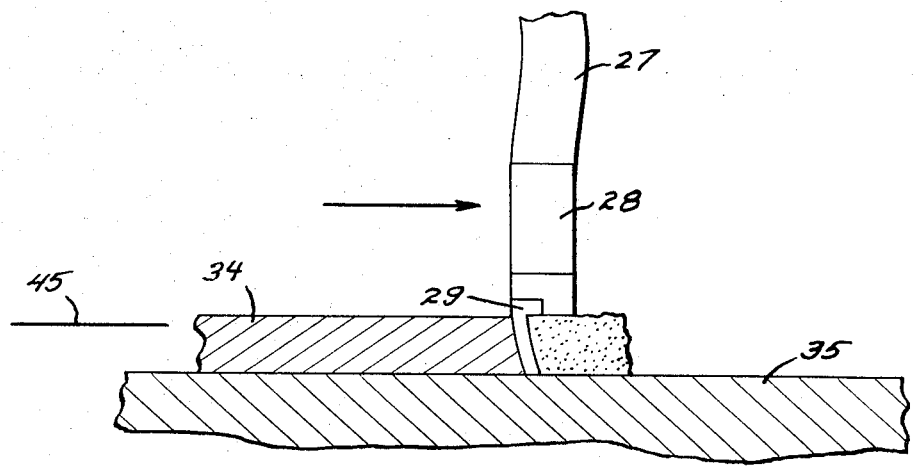
FIG. 3 is a schematic cross-sectional side view illustrating the extruding of a layer of carvable epoxy resin at a uniform thickness upon a preconstructed base to a point above the true net loft line of the master tooling model being constructed.

As shown in the schematic view of FIG. 3, a layer 34 of carvable epoxy resin is extruded onto the surface of the preconstructed base 35 to a uniform thickness of 1 inch to 1 ¼ inches. As previously discussed, the thickness of the layer being extruded can be varied as desired to meet the requirements of the particular application. The surface of the extruded layer 34 is thus located at a point above the true net loft line 45. The application of the extruded layer 34 is accomplished by moving the applicator nozzle 28 across the surface of the preconstructed base 35 at a controlled uniform rate while the carvable epoxy resin is being extruded therefrom. As shown in FIG. 3, a portion of the resin material moves ahead of the applicator nozzle as it is being dispensed.

The uniform thickness of the layer 34 being extruded is controlled by use of the spacer guide 29 provided on the nozzle 28. The lower edge of the guide 29 engages the surface of the base 35 and maintains the nozzle 28 at a uniform distance therefrom, thereby insuring that a layer of resin of uniform thickness is extruded thereon.

Depending upon the nature of the epoxy resin and size of the applicator apparatus being utilized, the application rate of extrusion can reach one cubic foot per minute or more. This allows an initial labor saving of up to 360 to 1 over previously used hand and spray application techniques.

Figure 4:
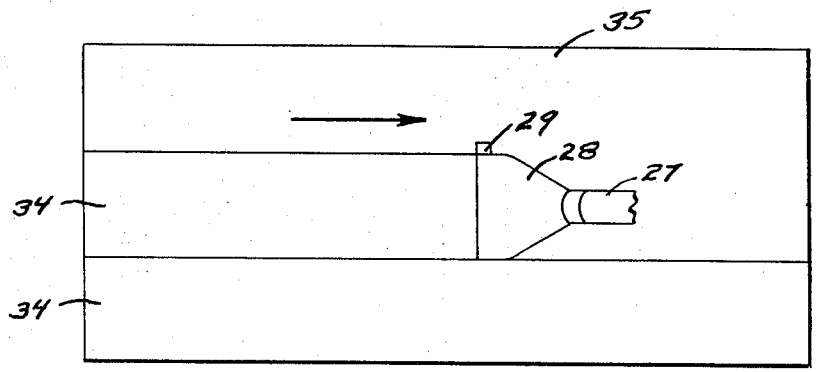
FIG. 4 is a schematic top view illustrating the extruding of contiguous strips of carvable epoxy resin upon the preconstructed base in order to form a continuous layer of carvable epoxy resin having a uniform thickness.

As shown in the schematic top view of FIG. 4, the carvable epoxy resin is extruded in contiguous strips 34 upon the surface of the preconstructed base 35. Upon curing, a continuous layer of resin is provided having a uniform thickness.

Figure 5:
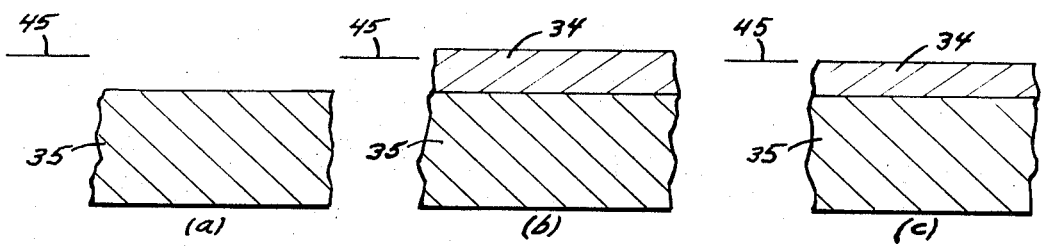
FIG. 5 is a series of schematic side cross-sectional views illustrating (a) the preconstructed base positioned below the true net loft line (b) the extruded layer of carvable epoxy resin extending above the true net loft line and (c) the extruded layer of carvable epoxy resin machined down to the true net loft line.

The steps for producing a master tooling model which are embodied in this invention are illustrated schematically in FIG. 5. FIG. 5a illustrates the construction of a base 35 having a surface below the true net loft line 45. FIG. 5b illustrates the extrusion of a layer 34 of carvable epoxy resin upon the base 35 to a height above the true net loft line 45. FIG. 5c illustrates the completed master tooling model whereby the layer 34 of carvable epoxy resin has been machined down to the true net loft line 45.

Figure 6:
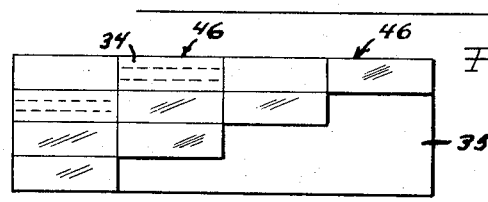
FIG. 6 is a schematic top view illustrating the pattern in which the strips of carvable epoxy resin material are extruded and cured in order to achieve and impart dimensional stability to the complete layer of carvable epoxy resin covering the entire surface of the master tooling.

In applications where very large master tools are being produced, the extruded carvable epoxy resin is applied in sections and is allowed to cure. This insures less shrinkage than is obtained when long continuous strips of resin material are extruded for the entire length of the model. The schematic top view of FIG. 6 illustrates an example of this sectional method of application. Each section 46 is applied to the base 35 and cured independently in a checkerboard manner as shown. For purposes of illustration, each section 46 is comprised of three strips 34 which are approximately 1 foot wide and 3 feet long. As each individual section 46 is cured, the intermediate vacant portions are filled so as to provide a continuous layer of carvable epoxy resin over the entire surface of the base 35. The dotted lines in FIG. 6 are for purposes of illustration only to designate the individual strips 34 of extruded material in each section 46. The rectangular section lines are also for purposes of illustration only. When the surface of the base 35 is covered, a single continuous layer of extruded material is provided at a uniform thickness on the base 35.

It is thus seen that a unique method and apparatus is provided whereby a master tooling model can be quickly and economically fabricated. A layer of carvable epoxy resin material is extruded upon a preconstructed base at a uniform thickness in a single application step. The use of the extrusion step to apply the carvable epoxy resin material has permitted the use of low density epoxy pastes with resultant savings in costs. The result has been the rapid application of air-free low density epoxy pastes without the attendant high costs, high waste and health hazards inherent in the previously used hand trowel and spray techniques.

All types of paste viscosity thermoset resins could be used in this process to produce a wide variety of tools. The materials can be extruded onto a prepared surface and removed when cured to produce a reverse surface duplication or otherwise applied and machined to a finish.

Examples of the types of carvable epoxy resins that can be utilized are shown by but are not limited to the carvable epoxy resins contained in the co-pending application, Ser. No. 775,510 entitled Carvable Epoxy Resin Compositions, filed Nov. 13, 1968, now U.S. Pat. No. 3,652,486.

Tools which can be fabricated with the foregoing extrusion process include N/C machined master patterns, N/C machined stretch form dies, N/C machined autoclave bond fixtures, N/C machined vacuum form tools, contour "splashes," drill and trim gates and jig pads and contour boards.

The use of the method and apparatus embodied in this invention for producing master models has resulted in savings heretofore not possible. The use of this new plastic tooling concept whereby a layer of carvable epoxy resin is extruded upon a preconstructed base results in the construction of a master tooling model which is quickly and inexpensively produced. Due to the low costs involved, the master tool no longer need be stored. Utilizing this new plastic tooling concept, the master tool can be destroyed after it has been used to obtain the intermediates. The N/C tape only is retained so as to machine any duplicate masters or units which may be needed in the future. The N/C tape alone can be sent quickly and inexpensively to other plants or suppliers for the N/C production of duplicate units at other locations with resultant savings in storage, handling and transportation costs.

Various other modifications of the invention may be made without departing from the principle thereof. Each of the modifications is to be considered as included in the hereinafter appended claims, unless these claims by their language express provide otherwise.

I claim;

1. In a method for producing a master tooling model having a true net loft line surface useful as a reference for the production of other similarly configured structures, the steps which include:
a. constructing a rough undersized master tooling model substructure base, said base having a surface below the true net loft line of the master tooling model being produced;
b. extruding a thick viscous layer of carvable curable resin at a uniform thickness upon said base to a point above the true net loft line of the master tooling model being produced;
c. curing the extruded layer of carvable resin; and
d. machining the surface of the cured carvable resin layer down to the true net loft line to form the master tooling model.

2. The method of claim 1 wherein the extruding step includes applying contiguous strips of said carvable curable resin upon said base so as to completely cover the surface of said base.

* * * * *